United States Patent [19]

Barbee

[11] 3,958,304
[45] May 25, 1976

[54] MACHINE FOR WASHING TRIPE

[75] Inventor: Wilford O. Barbee, Homer, Nebr.

[73] Assignee: Iowa Beef Processors, Inc., Dakota City, Nebr.

[22] Filed: Apr. 9, 1973

[21] Appl. No.: 349,538

[52] U.S. Cl. .................................... 17/43; 259/19
[51] Int. Cl.² ...................................... A22C 17/14
[58] Field of Search ............ 17/43, 45; 134/65, 132, 134/159

[56] References Cited
UNITED STATES PATENTS

| | | | |
|---|---|---|---|
| 644,400 | 2/1900 | Brooks | 17/43 |
| 1,433,861 | 10/1922 | Vlcheck | 134/159 |
| 2,037,081 | 4/1936 | Manning | 134/132 |
| 2,213,453 | 9/1940 | Schmidt | 17/43 |
| 2,296,257 | 9/1942 | Breckenridge | 68/142 |
| 3,032,043 | 5/1962 | Kearney | 134/159 |
| 3,498,839 | 3/1970 | Mehta | 134/65 |
| 3,612,491 | 10/1971 | McKillop | 259/177 R |

*Primary Examiner*—Robert Peshock
*Attorney, Agent, or Firm*—Zarley, McKee, Thomte, Voorhees & Sease

[57] ABSTRACT

A machine for washing tripe comprising an inclined housing having upper and lower ends with a central opening formed in the upper end thereof. A perforated drum is rotatably mounted in the housing and has an opening formed in its upper end with communicates with the central opening formed in the housing. A first spiral baffle is secured to the inside surface of the perforated drum for loading and agitating the tripe when the drum is rotated in a clockwise direction. A second spiral baffle is secured to the inside surface of the perforated drum for unloading the tripe when the drum is rotated in a counterclockwise direction. Means is provided for supplying water to the interior of the housing. Means is also provided for maintaining the water level within the housing so that a portion of the drum is submerged in the water.

2 Claims, 5 Drawing Figures

MACHINE FOR WASHING TRIPE

BACKGROUND OF THE INVENTION

This invention relates to a machine for washing tripe. The machine disclosed herein is especially well adapted for use with the method of washing tripe disclosed in the co-pending application, Ser. No. 323,881 filed Jan. 15, 1973.

Tripe has commercial value since it is used extensively in the manufacture of dog food. Tripe is also used for sausage or the like. Prior to the invention disclosed in the co-pending application, the problems associated with the methods of washing and preparing the tripe were enormous. The knap must be removed or washed from the tripe in order for the tripe to have commercial value. The knap must be removed from the tripe in such a manner so as to eliminate product shrink and so that the tripe has the proper pH value. Previous tripe washing machines had to be hand loaded and unloaded.

Therefore, it is a principal object of the invention to provide a machine for washing tripe.

A further object of the invention is to provide a machine for washing tripe which does not damage the tripe.

A further object of the invention is to provide a machine for washing tripe comprising a perforated drum rotatably mounted within an inclined housing.

A further object of the invention is to provide a machine for washing tripe wherein opposing spiral baffles are provided for agitating the tripe and unloading the tripe respectively.

A further object of the invention is to provide a machine for washing tripe which handles the tripe in a gentle manner.

A further object of the invention is to provide a machine for washing tripe which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figures 1, 2:
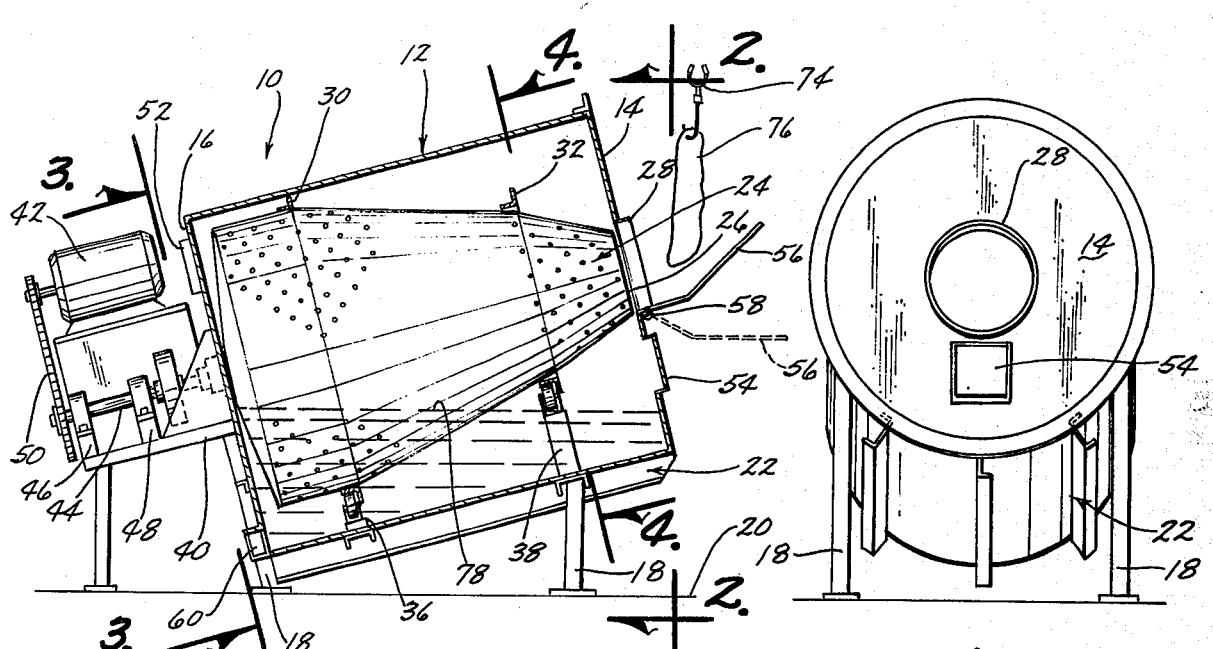
FIG. 1 is a side view of the machine with portions of the housing removed to more fully illustrate the invention.
FIG. 2 is an end view of the machine as seen along lines 2 — 2 of FIG. 1.
Figures 3, 4:
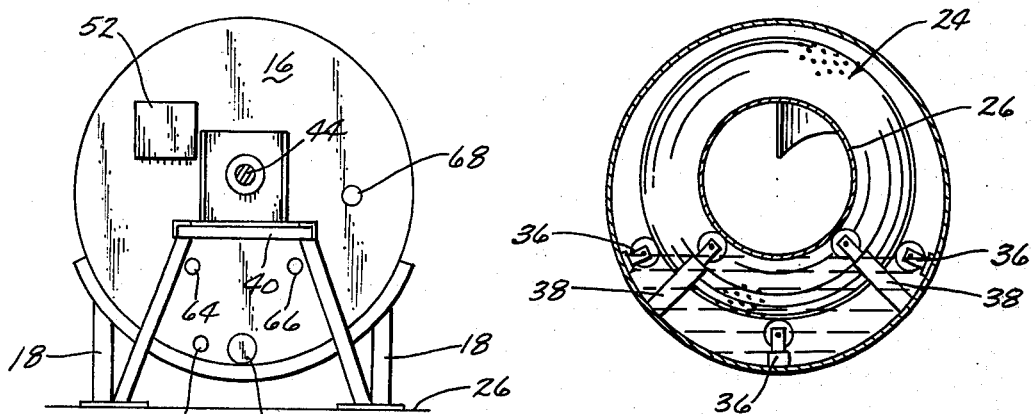
FIG. 3 is a sectional view of the machine as seen along lines 3 — 3 of FIG. 1.
FIG. 4 is a sectional view of the machine as seen on lines 4 — 4 of FIG. 1.
Figure 5:
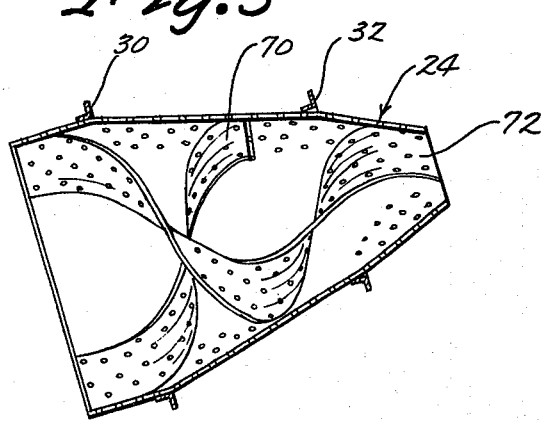
FIG. 5 is a sectional view of the perforated rotatable drum.

The machine of this invention is referred to generally by the reference numeral 10 comprising generally an inclined outer housing 12 having an upper end 14 and a lower end 16. The housing 10 is supported by legs 18 which are secured to a suitable support surface 20. The machine is provided with suitable reinforcing or strengthening means generally referred to by the reference numeral 22.

The numeral 24 refers to a perforated drum which is rotatably mounted in housing 12 and which has an open upper end 26 which communicates with the central opening or access opening 28 formed in the upper end 14 of housing 12. A pair of spaced apart angles or guides 30 and 32 are secured to the exterior surface of the drum 24 and extend therearound as seen in FIG. 1. A plurality of guide rollers 36 are secured to the inside surface of housing 12 and engage the angle 30 as also seen in FIG. 1. A plurality of guide rollers 38 are secured to the inside surface of housing 12 and engage the angle 32 as depicted in FIG. 1.

A frame 40 is provided at the drive end or lower end of the machine and supports a reversible motor 42 thereon. Shaft 44 is rotatably mounted on frame 40 by pillow block bearings 46 and 48 and is connected to the lower end of the drum 24 for rotation therewith. Chain 50 connects the motor 42 and the shaft 44 so that actuation of the reversible motor 42 will cause the drum 24 to be rotated.

An access door 52 is provided in the lower end 16 of housing 12. An access door 54 is provided in the upper end 14 of housing 12 below the central opening 28. Other access doors may be provided in the cylindrical wall surface of the housing 12 if so desired to facilitate cleaning of the interior of the housing 12.

The numeral 56 refers to a chute which is pivotally connected to the housing 12 at 58 and which is movable between the position illustrated by full lines in FIG. 1 to the position illustrated by broken lines in FIG. 1. The numeral 60 refers to a drain outlet formed in end 16 of housing 12 adjacent the lower end thereof. A steam inlet 62 is also provided in lower end 16 as are hot and cold water couplings 64 and 66 respectively. An outlet 68 is provided in lower end 16 for controlling the level of the water within the housing 12.

A spiral baffle 70 is secured to the inside surface of drum 24 for loading and agitating purposes when the drum 24 is rotated in one direction by the motor 42. A spiral baffle 72 is also secured to the inside surface of drum 24 for unloading the tripe from the drum 24 when the drum is rotated in a direction opposite to the loading and agitating direction. The numeral 74 refers to a conveyor which conveys the tripe 76 to a location adjacent the central opening 28. An apparatus is provided for automatically unloading the tripe 76 onto the chute 56.

The normal method of operation is as follows. The desired amount of hot and/or cold water is supplied to the interior of the housing 12 by means of the inlet couplings 64 and 66. The overflow outlet 68 maintains the water within the housing at a level generally referred to by the reference numeral 78 so that the lower portion of the drum 24 is submerged in the water. If desired, steam can be introduced into the interior of the housing and drum by means of the steam inlet 62.

The tripe 76 is automatically dumped onto the chute 56 which deflects the tripe into the interior of the drum 24 which is being rotated in a first direction by the motor 42. The spiral baffle 70 aids in loading the tripe 76 into the interior of the drum 24 and causes the tripe 76 to be agitated as the drum is being rotated. When the tripe has been sufficiently washed, the motor 42 is reversed to cause the drum 24 to be rotated in a direction opposite to the rotational movement of the washing cycle. The spiral baffle 72 conveys the tripe upwardly within the drum 24 so that the tripe is deposited on the chute 54 which has been lowered to the position illustrated by broken lines in FIG. 1. The tripe will then be conveyed to a suitable tripe collection means for draining and packaging.

Thus it can be seen that a novel machine has been provided for washing tripe which efficiently washes the tripe without causing excessive shrink or damage thereto. The level of the water is controlled within the housing and drum so that the washing efficiency is greatly enhanced. The machine of this invention eliminates the hand loading and unloading operations required by previous machines. Thus it can be seen that a machine has been provided for washing tripe which accomplishes at least all of its stated objectives.

I claim:

1. A machine for washing tripe comprising, an inclined cylindrical housing having upper and lower ends and having an access opening in the upper end thereof;

a perforated drum rotatably mounted in an inclined position in said housing and having upper and lower ends, said drum having an intake-discharge opening formed in its upper end which is in communication with said access opening of said housing, said drum substantially having its diameter tapered inwardly from its lower end to its upper end, power means for selectively rotating said drum in opposite directions, perforated baffle elements spirally positioned and secured to the interior of said drum for agitating tripe in said drum when said drum is rotated in one direction, and for discharging the tripe from said drum when said drum is rotated in a direction opposite to said one direction, means for supplying washing liquid to the interior of said housing, at least a portion of the lower end of said drum being submerged in the liquid provided by said means for supplying washing liquid without also having said intake discharge opening in said drum submerged in liquid, said drum being perforated at its lower end to permit washing fluid in said housing to freely enter said drum.

2. The machine of claim 1 wherein a tripe chute means is selectively pivotally secured to said housing below said access opening.

\* \* \* \* \*